United States Patent
Keller et al.

(10) Patent No.: US 11,470,528 B2
(45) Date of Patent: Oct. 11, 2022

(54) TECHNIQUE FOR PREPARING USER EQUIPMENT MOBILITY

(71) Applicant: Telefonaktiebolaget LM Ericsson (publ), Stockholm (SE)

(72) Inventors: Ralf Keller, Würselen (DE); Afshin Abtin, Sollentuna (SE); Ann-Christine Sander, Gothenburg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 17 days.

(21) Appl. No.: 17/266,841

(22) PCT Filed: Aug. 21, 2018

(86) PCT No.: PCT/EP2018/072516
§ 371 (c)(1),
(2) Date: Feb. 8, 2021

(87) PCT Pub. No.: WO2020/038561
PCT Pub. Date: Feb. 27, 2020

(65) Prior Publication Data
US 2021/0352552 A1    Nov. 11, 2021

(51) Int. Cl.
*H04W 4/00*      (2018.01)
*H04W 36/18*     (2009.01)
(Continued)

(52) U.S. Cl.
CPC .......... *H04W 36/18* (2013.01); *H04W 60/06* (2013.01); *H04W 76/34* (2018.02)

(58) Field of Classification Search
CPC . H04W 36/0005; H04W 36/14; H04W 36/16; H04W 36/18; H04W 36/34;
(Continued)

(56) References Cited

U.S. PATENT DOCUMENTS

2015/0365856 A1* 12/2015 Krishnamoorthy ... H04W 76/27
                                                        370/331
2018/0192337 A1*  7/2018 Ryu ...................... H04W 36/14
(Continued)

FOREIGN PATENT DOCUMENTS

WO    2011056046 A2    5/2011

OTHER PUBLICATIONS

International Search Report and Written Opinion dated May 23, 2019 for International Application No. PCT/EP2018/072516 filed on Aug. 21, 2018, consisting of 11-pages.
(Continued)

*Primary Examiner* — Matthew W Genack
(74) *Attorney, Agent, or Firm* — Christopher & Weisberg, P.A.

(57) ABSTRACT

A technique for preparing User Equipment, UE, mobility from a 4G network to a 5G network for a UE moving from a 2G/3G network to the 5G network via the 4G network is disclosed. A method implementation of the technique is performed by a network node and comprises triggering terminating one or more Packet Data Network, PDN, connections associated with the UE when the UE moves from the 2G/3G network to the 4G network forcing the UE to reestablish connectivity with the 4G network prior to moving from the 4G network to the 5G network.

18 Claims, 6 Drawing Sheets

(51) Int. Cl.
*H04W 76/34* (2018.01)
*H04W 60/06* (2009.01)

(58) Field of Classification Search
CPC ..... H04W 36/38; H04W 60/00; H04W 60/06; H04W 76/00; H04W 76/20; H04W 76/30; H04W 76/34
See application file for complete search history.

(56) References Cited

U.S. PATENT DOCUMENTS

| | | | | |
|---|---|---|---|---|
| 2019/0223076 | A1* | 7/2019 | Albasheir | H04W 8/08 |
| 2020/0178068 | A1* | 6/2020 | Muhanna | H04L 63/205 |
| 2021/0136658 | A1* | 5/2021 | Rönneke | H04W 68/02 |

OTHER PUBLICATIONS

3GPP TS 23.380 V13.2.0; 3rd Generation Partnership Project; Technical Specification Group Core Network and Terminals; IMS Restoration Procedures (Release 13), Mar. 2016, consisting of 41-pages.

SA WG2 Meeting #123 S2-177739; Title: Handling of Ethernet and unstructured PDU session types when interworking with EPC (23.502); Source: Ericsson; Agenda Item: 6.5.9; Work Item/Release: 5GS_ph1/Rel-15; Document for: Approval; Date and Location: Oct. 23-27, 2017, Ljubljana, Slovenia, consisting of 9-pages.

ETSI TS 123 502 V15.2.0; 5G; Procedures for the 5G System (3GPP TS 23.502 version 15.2.0 Release 15), Jun. 2018, consisting of 311-pages.

SA WG2 Meeting #122 S2-174594; Title: TS 23.502: Discussion on EPS QoS Mapping; Source: CATT; Agenda Item: 6.5.9; Work Item/Release: 5GS_Ph1/Rel-15; Document for: Discussion/Approval; Date and Location: Jun. 26-30, 2017, San Jose Del Cabo, Mexico, consisting of 2-pages.

ETSI TS 123 221 V12.0.0; Digital cellular telecommunications system (Phase 2+); Universal Mobile Telecommunications System (UMTS); LTE; Architectural requirements (3GPP TS 23.221 version 12.0.0 Release 12), Oct. 2014, consisting of 54-pages.

ETSI TS 123 401 V12.6.0; 5G; LTE; General Packet Radio Service (GPRS) enhancements for Evolved Universal Terrestrial Radio Access Network (E-UTRAN) access (3GPP TS 23.401version 12.6.0 Release 12), Sep. 2014, consisting of 308-pages.

* cited by examiner

TECHNIQUE FOR PREPARING USER EQUIPMENT MOBILITY

CROSS-REFERENCE TO RELATED APPLICATIONS

This application is a Submission Under 35 U.S.C. § 371 for U.S. National Stage Patent Application of International Application Number: PCT/EP2018/072516, filed Aug. 21, 2018 entitled "TECHNIQUE FOR PREPARING USER EQUIPMENT MOBILITY," the entirety of which is incorporated herein by reference.

TECHNICAL FIELD

The present disclosure generally relates to the field of wireless communication. In particular, a technique for preparing User Equipment (UE) mobility from a 4G network to a 5G network for a UE moving from a 2G/3G network to the 5G network via the 4G network is presented. The technique may be embodied in methods, computer programs, apparatuses and systems.

BACKGROUND

Over the recent decades, several generations of mobile communication systems have been deployed. While mobile communication systems according to the first generation (1G) are generally based on analog transmission, second generation (2G) mobile communications systems have introduced—by means of the Global System for Mobile Communications (GSM) standard—digital transmission techniques for the first time. The General Packet Radio Service (GPRS) and High Speed Circuit Switched Data (HSCSD) standards—sometimes also classified as 2.5G systems—have been introduced for the transmission of data, and the Enhanced Data Rates for GSM Evolution (EDGE) standard has been developed as an enhancement for the transmission rates in GSM systems. The introduction of the Universal Mobile Telecommunications System (UMTS) has established a third generation (3G) of mobile communication systems which particularly enables data driven services, such as video telephony and mobile broadband Internet access, for example. The UMTS standard has further been enhanced by the High Speed Packet Access (HSPA) and HSPA+ standards. In the following, the term "2G/3G" will be used to denote any standard of a 2G or 3G system, including the ones mentioned above.

The Long Term Evolution (LTE) standard has been introduced as a fourth generation (4G) mobile communication system and has been enhanced by the LTE Advanced and LTE Advanced Pro standards. The next generation, i.e., the fifth generation (5G), of mobile communications systems is currently under development and generally aims at providing support for enhanced mobile broadband (e.g., for Ultra High Definition (UHD) and virtual presence), support for critical communication (e.g., for robot/drone and emergency communication), support for massive machine type communication (e.g., for e-health applications), support for enhanced network operation (e.g., network slicing and interworking) and support for vehicle-to-everything communication (e.g., for autonomous driving), for example. Much of the standardization work on the above-mentioned standards is and has been done by the 3rd Generation Partnership Project (3GPP).

For the ongoing standardization of 5G networks, there has been a general requirement that interworking with 2G/3G networks should not be taken into account in order to allow minimizing legacy aspects for 5G networks and to avoid the requirement of supporting direct interfaces between 5G networks and 2G/3G networks, for example. The assumption was that mobility between 5G networks and 2G/3G networks, if needed, would generally work via 4G networks, i.e., from 5G networks to 4G networks and then from 4G networks to 2G/3G networks, and vice versa. In practice, however, mobility may also occur directly between 5G networks and 2G/3G networks and, also, there may be restrictions which are unacceptable for some deployments which have not yet been discussed or investigated in detail. Direct mobility between 5G networks and 2G/3G networks may be required due to radio planning reasons of operators, or due to base stations being temporarily out of order, for example.

Figure 1:
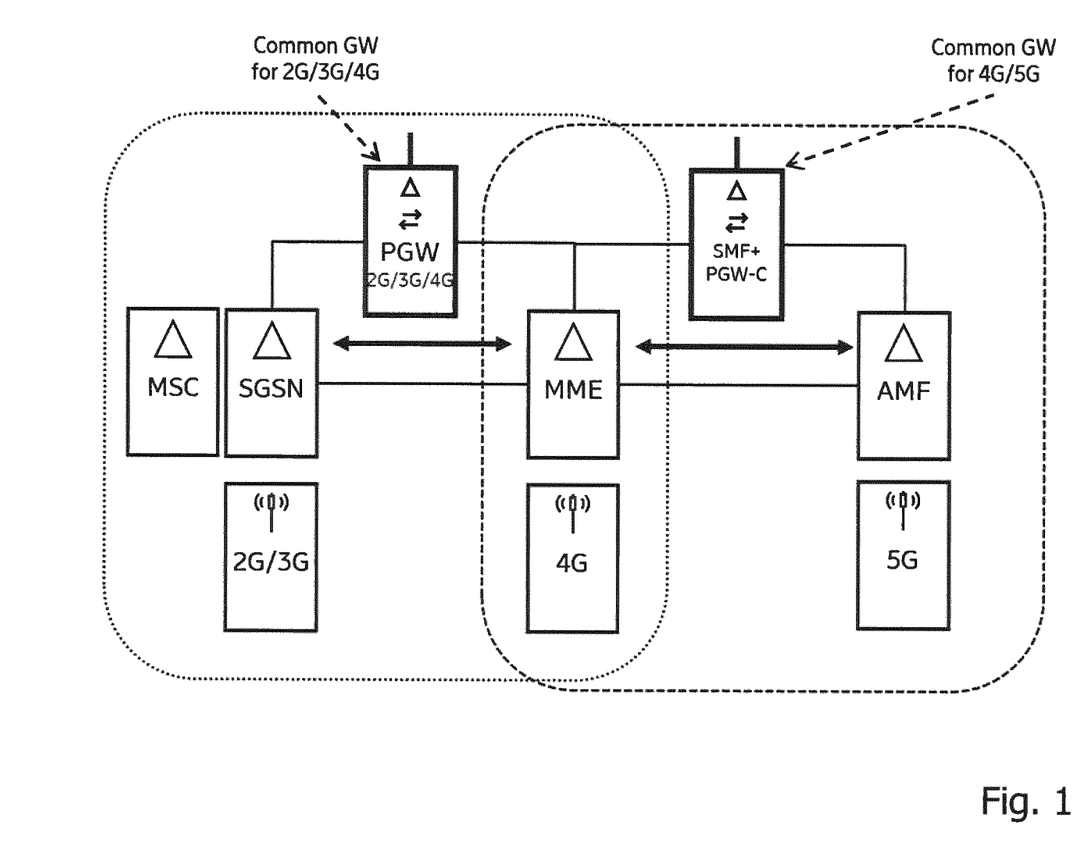
FIG. 1 illustrates an exemplary deployment scenario in which a legacy PGW acts as a common gateway serving a 2G/3G network and a 4G network and an SMF+PGW-C acts as a common gateway serving the 4G network and a 5G network.

As an example, it is referred to the deployment scenario illustrated in FIG. 1 in which a legacy Packet Data Network Gateway (PGW) acts as a common gateway serving the 2G/3G network as well as the 4G network and a Session Management Function+Packet Data Network Gateway-Control (SMF+PGW-C) entity acts as a common gateway supporting interworking between and serving the 4G network as well as the 5G network. When an Access Point Name (APN) is established for a UE in 2G/3G coverage in this scenario, it will generally survive when the UE moves to the 4G network. Further mobility to the 5G network will not be seamless, however. For example, when a legacy PGW is selected for an IP Multimedia Subsystem (IMS) APN, a UE having an IMS Packet Data Protocol (PDP) context in the 2G/3G network can keep the IMS APN in the 4G network. Moving further to the 5G network may be problematic, however, because a setup of a new Protocol Data Unit (PDU) session as well as a new IMS registration may be required. This may not only result in additional network load but also in a session break, so that a voice call on the IMS APN of the 4G network cannot be handed over to the 5G network and, instead, calls are dropped.

SUMMARY

Accordingly, there is a need for a technique which avoids one or more of the problems discussed above, or other problems.

According to a first aspect, a method for preparing UE mobility from a 4G network to a 5G network for a UE moving from a 2G/3G network to the 5G network via the 4G network is provided. The method is performed by a network node and comprises triggering terminating one or more Packet Data Network (PDN) connections associated with the UE when the UE moves from the 2G/3G network to the 4G network forcing the UE to reestablish connectivity with the 4G network prior to moving from the 4G network to the 5G network.

Terminating the one or more PDN connections associated with the UE may be triggered by the network node during or after the mobility procedure from the 2G/3G network to the 4G network but is performed prior to the mobility procedure from the 4G network to the 5G network. When the UE reestablishes connectivity with the 4G network, connectivity may be established using at least one common network entity that supports interworking between the 4G network and the 5G network. The at least one common network entity may comprise an SMF+PGW-C acting as common gateway for both the 4G and the 5G network, for example. Triggering terminating the one or more PDN connections may thus be performed to ensure that, when reestablishing connectivity by the UE, at least one common network entity is selected which supports interworking between the 4G network and the 5G network so that seamless mobility of the UE from the 4G network to the 5G network may be performed.

The network node may be a node of the 4G network, such as a Mobility Management Entity (MME), a Policy and Charging Rules Function (PCRF) or a PGW, for example, but it will be understood that the technique presented herein may be performed by any other appropriate network node as well, including a node from the 2G/3G network, such as a Serving GPRS Support Node (SGSN), for example. In any case, the network node may be configured to keep track of the source access technology and the target access technology in the mobility scenario so that, depending on the particular source access technology and target access technology (e.g., respective Radio Access Technology (RAT) types), the network node may decide on triggering the termination of the one or more PDN connections associated with the UE. When the UE reestablishes connectivity with the 4G network, the selection of the at least one common network entity that supports interworking between the 4G network and the 5G network may be performed by the network node (e.g., the MME) or another network node in the respective network.

Mobility from the 2G/3G network to the 4G network may involve an Inter Radio Access Technology (IRAT) handover, for example, but it will be understood that the technique presented herein may be employed in all other cases of UE mobility from the 2G/3G network to the 4G network as well. Mobility may take place in both idle mode and connected mode. As an example, the technique may be applied to cases of idle mode mobility when the UE reselects the RAT or to cases of redirects, e.g., when the Radio Access Network (RAN) directs the UE to a different RAN which employs a different RAT. A GSM EDGE Radio Access Network (GERAN) of a 2G network or a UMTS Terrestrial Radio Access Network (UTRAN) of a 3G network may direct the UE to an Evolved UTRAN (E-UTRAN) of a 4G network, for example.

Triggering terminating the one or more PDN connections may be conditionally performed when the UE is determined to have 5G capabilities (e.g., capabilities to attach to a 5G system (5GS)). In other words, the presence of 5G capabilities of the UE may be used as a condition for triggering terminating the one or more PDN connections so that triggering terminating the one or more PDN connections may only be performed when the UE is determined to have 5G capabilities. An indication that the UE has 5G capabilities may be obtained from the UE. The network node may obtain this indication directly from the UE (e.g., in a signaling procedure involving both the UE and the network node) or in an indirect manner (e.g., from another network node which obtained the indication from the UE previously). For example, the indication that the UE has 5G capabilities may be obtained during an attach procedure performed by the UE with the 2G/3G network or during a Tracking Area Update (TAU) procedure performed by the UE with the 4G network. The indication may be conveyed in the form of a network capability information element as part of the UE network capabilities provided from the UE to the network, for example.

Alternatively or additionally, triggering terminating the one or more PDN connections may be conditionally performed when the UE is determined to have a 5G subscription, e.g., when subscription information related to a subscriber of the UE indicates that the subscriber has a 5G subscription. Such subscription information may be obtained from a Home Subscriber Server (HSS) of the 4G network or a Home Location Register (HLR) of the 2G/3G network, for example.

Still alternatively or additionally, triggering terminating the one or more PDN connections may be conditionally performed when at least one APN associated with the one or more PDN connections corresponds to a predetermined type of APN. In one variant, the predetermined type of APN may be an APN type that is not usable with the 5G network, e.g., an APN type that is only applicable to 2G/3G/4G networks and that would fail if applied with a 5G network. In another variant, the predetermined type of APN may be an APN type that supports provisioning of a real-time service to the UE. This may be an IMS APN that is used to provide voice (Voice over IP, VoIP) or other real-time based multimedia services to the UE, for example.

Further alternatively or additionally, triggering terminating the one or more PDN connections may be conditionally performed when an indication from another network node is received requesting to release PDN connections when moving from a 2G/3G network to a 4G network. Such other network node may be an HSS, for example, which may store UE related information indicating that PDN connections should be released upon mobility from a 2G/3G network to a 4G network and which may provide such information to the MME, which triggers terminating the one or more PDN connections accordingly.

Triggering terminating the one or more PDN connections may be carried out in various ways. In one variant, triggering terminating the one or more PDN connections may comprise initiating a disconnection procedure for each of the one or more PDN connections. In particular, the one or more PDN connections may comprise all PDN connections associated with the UE, so that seamless mobility from the 4G network to the 5G network may be provided for all services used by the UE. Initiating a disconnection procedure may particularly be performed when the respective PDN connection is not the last PDN connection of the UE. In another variant, especially when the respective PDN connection is the last PDN connection of the UE or when all PDN connections of the UE are to be released, triggering terminating the one or more PDN connections may comprise initiating a detach procedure for the UE. In either case, triggering terminating the one or more PDN connections may further comprise requesting the UE to reactivate the one or more PDN connections. This may be done by initiating the respective PDN disconnection procedure or the detach procedure with the Non-Access Stratum (NAS) cause code "reactivation request", for example. If the network node is an MME or SGSN, the network node may also release the same PDN connections towards the PGW by sending a session delete message to the PGW. As a result of the release of the one or more PDN connections, the UE may reactivate the one or more PDN connections, wherein the at least one common network entity that supports interworking between the 4G network and the 5G network may be selected, as described above.

As a mere example, if a PDN connection associated with an IMS APN is released when moving from a 2G/3G network to a 4G network, a voice centric UE (e.g., a smartphone) may reestablish the PDN connection associated with the IMS APN again. This may result in the MME selecting an SMF+PGW-C to act as a common gateway for both the 4G network and the 5G network and a new IMS registration may then be performed by the UE.

According to a second aspect, a computer program product is provided. The computer program product comprises program code portions for performing the method of the first aspect when the computer program product is executed on one or more computing devices (e.g., a processor or a distributed set of processors). The computer program product may be stored on a computer readable recording medium, such as a semiconductor memory, DVD, CD-ROM, and so on.

According to a third aspect, a network node for preparing UE mobility from a 4G network to a 5G network for a UE moving from a 2G/3G network to the 5G network via the 4G network is provided. The network node is configured to perform any of the method steps presented herein with respect to the first aspect. The network node may comprise at least one processor and at least one memory, wherein the at least one memory contains instructions executable by the at least one processor such that the network node is operable to perform any of the method steps presented herein with respect to the first aspect.

According to a fourth aspect, there is provided a system comprising a network node according to the third aspect.

BRIEF DESCRIPTION OF THE DRAWINGS

Implementations of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 2:
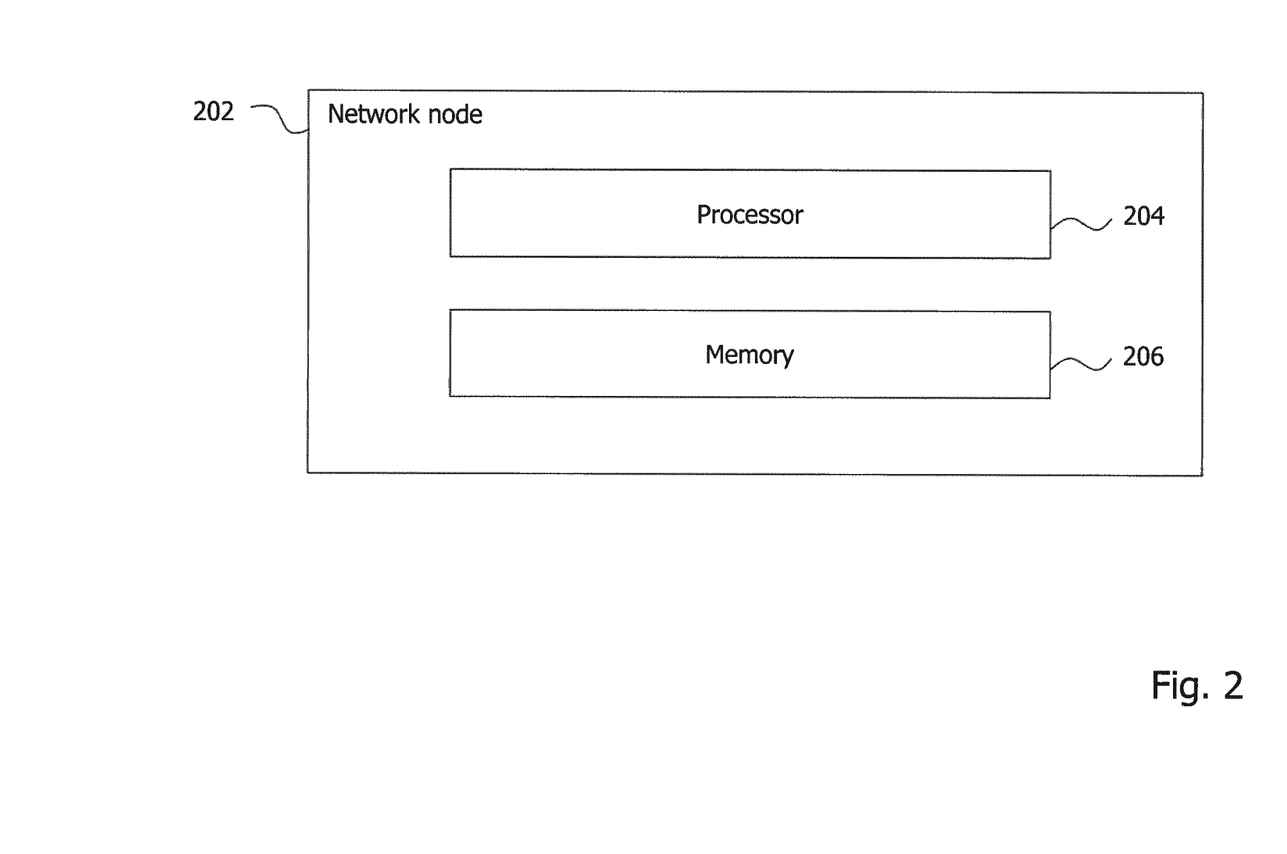
FIG. 2 illustrates an exemplary composition of a network node according to the present disclosure.

FIG. 2 schematically illustrates an exemplary composition of a network node 202 for preparing UE mobility from a 4G network to a 5G network for a UE moving from a 2G/3G network to the 5G network via the 4G network. The network node 202 comprises at least one processor 204 and at least one memory 206, wherein the at least one memory 206 contains instructions executable by the at least one processor 204 such that the network node 202 is operable to carry out the method steps described herein below.

It will be understood that the network node 202 may be implemented as a physical computing unit as well as in the form of a function or a virtualized computing unit, such as a virtual machine, for example. It will further be appreciated that the network node 202 may not necessarily be implemented as a standalone computing unit, but may be implemented as components—realized in software and/or hardware—residing on multiple distributed computing units as well, such as in a cloud computing environment, for example.

Figure 3A:
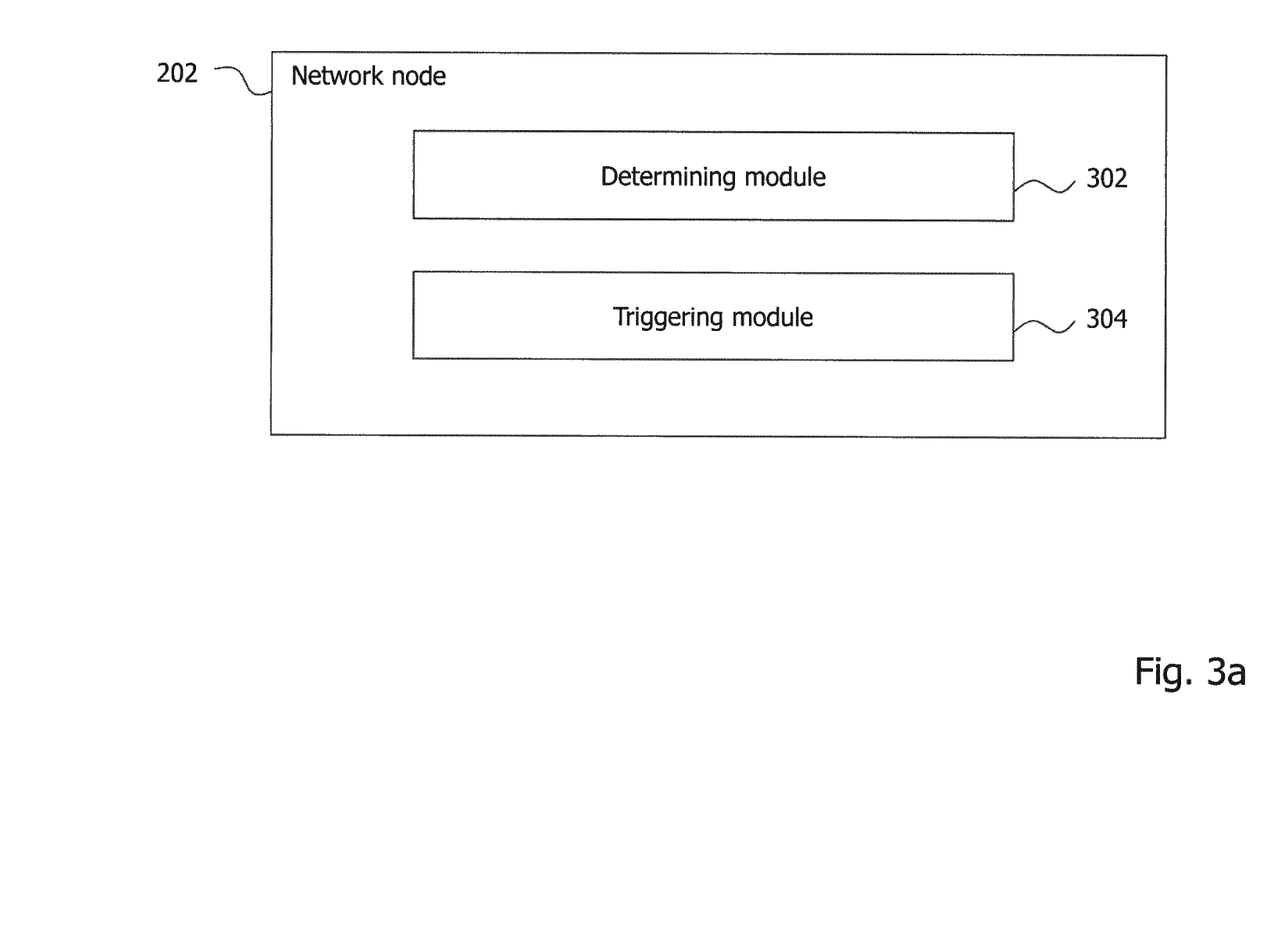
FIGS. 3a and 3b illustrate a modular composition of the network node and a corresponding method embodiment which may be performed by the network node.
Figure 3B:
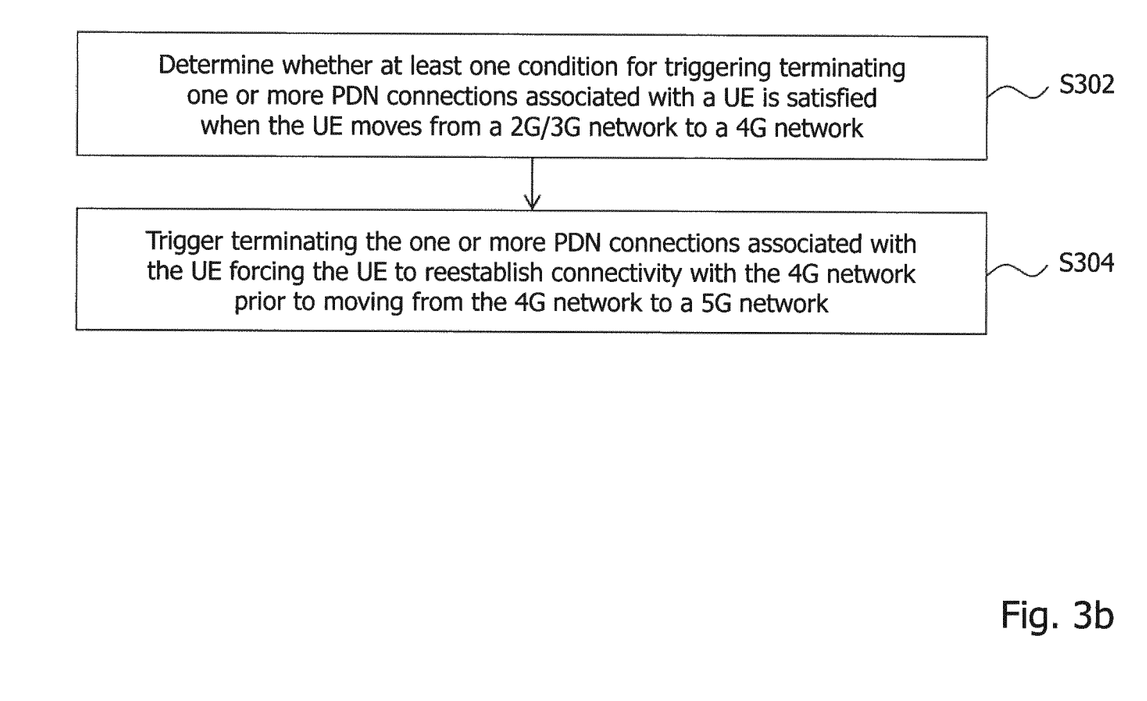

FIG. 3a schematically illustrates an exemplary modular composition of the network node 202 and FIG. 3b illustrates a corresponding method which may be performed by the network node 202. The basic operation of the network node 202 will be described in the following with reference to both FIGS. 3a and 3b.

In step S302, a determining module 302 of the network node 202 may determine whether at least one condition for triggering terminating one or more PDN connections associated with the UE is satisfied when the UE moves from the 2G/3G network to the 4G network. If it is determined that the at least one condition is satisfied, a triggering module 304 of the network node 202 may trigger, in step S304, terminating the one or more PDN connections associated with the UE forcing the UE to reestablish connectivity with the 4G network prior to moving from the 4G network to the 5G network.

Terminating the one or more PDN connections associated with the UE may be triggered by the network node 202 during or after the mobility procedure from the 2G/3G network to the 4G network but is performed prior to the mobility procedure from the 4G network to the 5G network. When the UE reestablishes connectivity with the 4G network, connectivity may be established using at least one common network entity that supports interworking between the 4G network and the 5G network. The at least one common network entity may comprise an SMF+PGW-C acting as a common gateway for both the 4G and the 5G network, for example. Triggering terminating the one or more PDN connections may thus be performed to ensure that, when the reestablishing connectivity by the UE, at least one common network entity is selected that supports interworking between the 4G network and the 5G network so that seamless mobility of the UE from the 4G network to the 5G network may be performed.

The network node 202 may be a node of the 4G network, such as an MME, a PCRF or a PGW, for example, but it will be understood that the technique presented herein may be performed by any other appropriate network node as well, including a node from the 2G/3G network, such as an SGSN, for example. In any case, the network node 202 may be configured to keep track of the source access technology and the target access technology in the mobility scenario so that, depending on the particular source access technology and target access technology (e.g., respective RAT types) the network node 202 may decide on triggering the termination of the one or more PDN connections associated with the UE. When the UE reestablishes connectivity with the 4G network, the selection of the at least one common network entity that supports interworking between the 4G network and the 5G network may be performed by the network node (e.g., the MME) or another network node in the respective network.

Mobility from the 2G/3G network to the 4G network may involve an IRAT handover, for example, but it will be understood that the technique presented herein may be employed in all other cases of UE mobility from the 2G/3G network to the 4G network as well. Mobility may take place in both idle mode and connected. As an example, the technique may be applied to cases of idle mode mobility when the UE reselects the RAT or to cases of redirects, e.g., when the RAN directs the UE to a different RAN which employs a different RAT. A GERAN of a 2G network or a UTRAN of a 3G network may direct the UE to an E-UTRAN of a 4G network, for example.

The at least one condition for triggering terminating the one or more PDN connections associated with the UE determined in step S302 may refer to at least one of the following. In one variant, triggering terminating the one or more PDN connections may be conditionally performed when the UE is determined to have 5G capabilities (e.g., capabilities to attach to a 5G system (5GS)). In other words, the presence of 5G capabilities of the UE may be used as a condition for triggering terminating the one or more PDN connections so that triggering terminating the one or more PDN connections may only be performed when the UE is determined to have 5G capabilities. An indication that the UE has 5G capabilities may be obtained from the UE. The network node 202 may obtain this indication directly from the UE (e.g., in a signaling procedure involving both the UE and the network node 202) or in an indirect manner (e.g., from another network node which obtained the indication from the UE previously). For example, the indication that the UE has 5G capabilities may be obtained during an attach procedure performed by the UE with the 2G/3G network or during a TAU procedure performed by the UE with the 4G network. The indication may be conveyed in the form of a network capability information element as part of the UE network capabilities provided from the UE to the network, for example.

In another variant, triggering terminating the one or more PDN connections may be conditionally performed when the UE is determined to have a 5G subscription, e.g., when subscription information related to a subscriber of the UE indicates that the subscriber has a 5G subscription. Such subscription information may be obtained from an HSS of the 4G network or an HLR of the 2G/3G network, for example.

In still another variant, triggering terminating the one or more PDN connections may be conditionally performed when at least one APN associated with the one or more PDN connections corresponds to a predetermined type of APN. In one such case, the predetermined type of APN may be an APN type that is not usable with the 5G network, e.g., an APN type that is only applicable to 2G/3G/4G networks and that would fail if applied with a 5G network. In another such case, the predetermined type of APN may be an APN type that supports provisioning of a real-time service to the UE. This may be an IMS APN that is used to provide voice (VoIP) or other real-time based multimedia services to the UE, for example.

In a further variant, triggering terminating the one or more PDN connections may be conditionally performed when an indication from another network node is received by the network node 202 requesting to release PDN connections when moving from a 2G/3G network to a 4G network. Such other network node may be an HSS, for example, which may store UE related information indicating that PDN connections should be released upon mobility from a 2G/3G network to a 4G network and which may provide such information to the MME, which triggers terminating the one or more PDN connections accordingly.

Triggering terminating the one or more PDN connections in accordance with step S304 may be carried out in various ways. In one variant, triggering terminating the one or more PDN connections may comprise initiating a disconnection procedure for each of the one or more PDN connections. In particular, the one or more PDN connections may comprise all PDN connections associated with the UE, so that seamless mobility from the 4G network to the 5G network may be provided for all services used by the UE. Initiating a disconnection procedure may particularly be performed when the respective PDN connection is not the last PDN connection of the UE. In another variant, particularly when the respective PDN connection is the last PDN connection of the UE or when all PDN connections of the UE are to be released, triggering terminating the one or more PDN connections may comprise initiating a detach procedure for the UE. In either case, triggering terminating the one or more PDN connections may further comprise requesting the UE to reactivate the one or more PDN connections. This may be done by initiating the respective PDN disconnection procedure or the detach procedure with the NAS cause code "reactivation request", for example. If the network node 202 is an MME or SGSN, the network node 202 may also release the same PDN connections towards the PGW by sending a session delete message to the PGW. As a result of the release of the one or more PDN connections, the UE may reactivate the one or more PDN connections, wherein the at least one common network entity that supports interworking between the 4G network and the 5G network may be selected, as described above.

As a mere example, if a PDN connection associated with an IMS APN is released when moving from a 2G/3G network to a 4G network, a voice centric UE (e.g., a smartphone) may reestablish the PDN connection associated with the IMS APN again. This may result in the MME selecting an SMF+PGW-C acting as a common gateway for both the 4G and the 5G network and a new IMS registration may then be performed by the UE.

Figure 4:
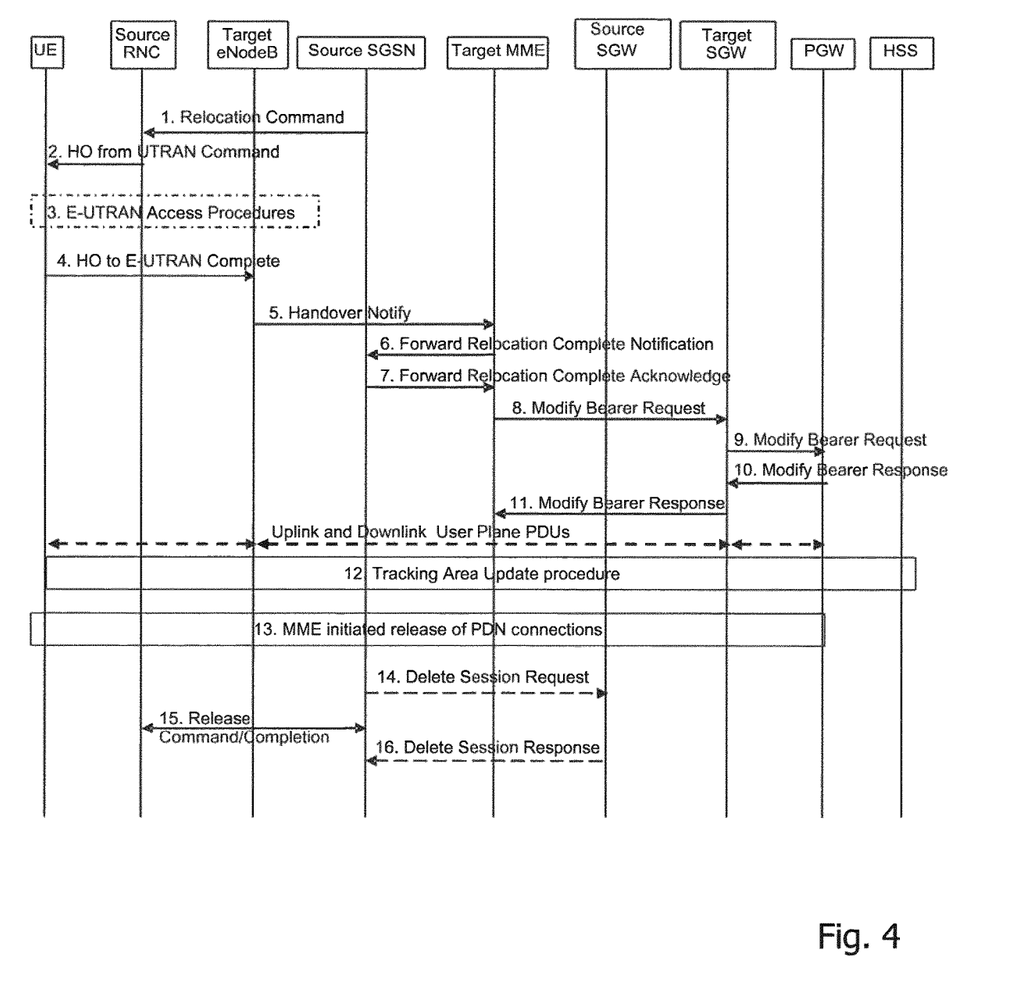
FIG. 4 illustrates a signaling diagram of an exemplary IRAT handover procedure from a 2G/3G network to a 4G network according to the present disclosure.

FIG. 4 illustrates a signaling diagram of an exemplary IRAT handover procedure from a 2G/3G network to a 4G network according to the present disclosure. More specifically, the signaling diagram shows an UTRAN to E-UTRAN IRAT handover procedure, in which the MME learns about the 5G capabilities of the UE during the TAU procedure. It will be understood that this procedure is merely exemplary and that the technique presented herein may be employed in other cases of UE mobility from the 2G/3G network to the 4G network as well. It will further be understood that the procedure shown in FIG. 4 is simplified and mainly focuses on those aspects which are relevant for understanding the technique presented herein. The UTRAN to E-UTRAN IRAT handover procedure may generally take place when the network decides to perform a handover, e.g., based on radio condition measurements reported by the UE to the Radio Network Controller (RNC) of the UTRAN. In the following, entities denoted as "source" entity refer to entities of the 2G/3G network and entities denoted as "target" entity refer to entities of the 4G network.

In step 1, the source SGSN initiates the IRAT procedure by sending a Relocation Command to the source RNC which instructs, in step 2, the UE to handover to the target eNodeB by sending a Handover from UTRAN Command. In step 3, the UE moves to the E-UTRAN and performs corresponding access procedures towards the target eNodeB. When the UE has access to the target eNodeB, it sends, in step 4, a Handover to E-UTRAN Complete message to the target eNodeB which then informs, in step 5, the target MME by sending a Handover Notify message accordingly. The target MME then knows that the UE has arrived at the target side and the MME informs, in step 6, the source SGSN by sending a Forward Relocation Complete Notification message. In step 7, the source SGSN acknowledges by sending back a Forward Relocation Complete Acknowledge message. In step 8, the target MME continues the IRAT handover procedure by informing the target SGW that the target MME is now responsible for all bearers that the UE has established. This is performed using the Modify Bearer Request message per PDN connection. The target SGW then informs, in step 9, the PGW of the change by sending a Modify Bearer Request message per PDN connection itself. These requests are acknowledged from the PGW to the target SGW in step 10, as well as from the target SGW to the target MME in step 11. At this stage, the user plane path is established for all bearers between the UE, the target eNodeB, the target SGW and the PGW.

In step 12, a TAU procedure is performed. As part of the TAU procedure, the UE may provide its 5G NAS capabilities to the target MME in order to inform the target MME that the UE is capable of registering with a 5G network. The MME may also receive an indication from the HSS that PDN connections of the UE should be released upon mobility from the UTRAN to the E-UTRAN, for example. In step 13, the target MME then decides which PDN connections associated with the UE are to be released and triggers terminating the selected PDN connections accordingly, e.g., using the procedure described below in relation to FIG. 5. The decision on whether to release a PDN connection associated with the UE may be based on either the 5G NAS capabilities, the indication from the HSS, or a combination thereof. In steps 14 to 16, the source SGSN performs a clean-up procedure with the source SGW and the source RNC in order to clean up all resources in the UTRAN and to thereby complete the IRAT handover procedure.

Figure 5:
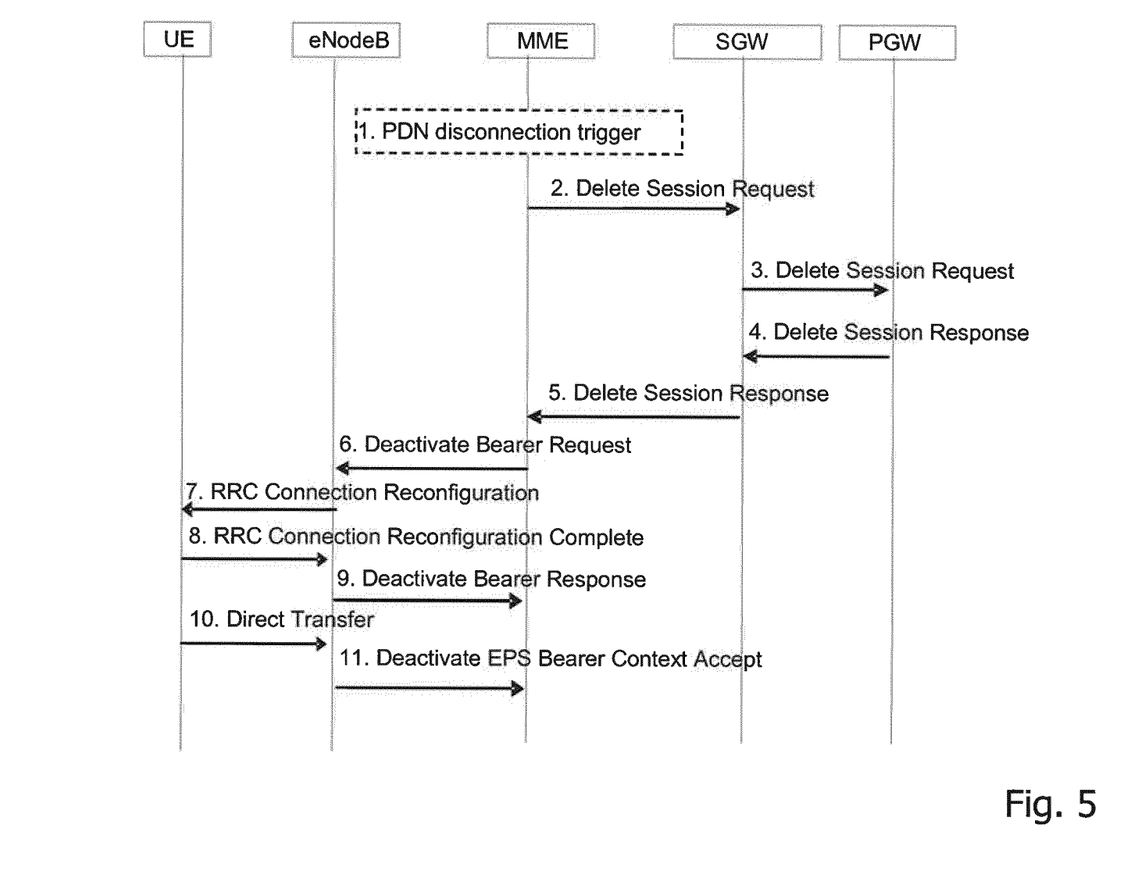
FIG. 5 illustrates a signaling diagram of an exemplary PDN disconnection procedure according to the present disclosure.

FIG. 5 illustrates a signaling diagram of an exemplary PDN disconnection procedure for an E-UTRAN according to the present disclosure. In step 1 of the procedure, the MME decides on releasing a PDN connection and triggers terminating the PDN connection. If the PDN connection was served by a PGW, the Evolved Packet System (EPS) Bearers for the particular PDN connection are deactivated by the MME through sending, in step 2, a Delete Session Request message to the SGW. The SGW also sends a Delete Session Request message to the PGW in step 3 which, in turn, acknowledges by sending back a Delete Session Response in step 4. The SGW sends back, in step 5, a Delete Session Response message as well. In step 6, the MME initiates the deactivation of all Radio Bearers associated with the PDN connection by sending a Deactivate Bearer Request message to the eNodeB which, in turn, sends, in step 7, a Radio Resource Control (RRC) Connection Reconfiguration message including the bearers to be released to the UE. The UE then releases, in step 8, all resources corresponding to the PDN connection and acknowledges by sending an RRC Connection Reconfiguration Complete message back to the eNodeB. The eNodeB, in turn, sends, in step 9, an acknowledgment of the deactivation to the MME by sending a Deactivate Bearer Response message. Finally, in step 10, the UE sends a Direct Transfer message to the eNodeB which, in turn, sends, in step 11, a Deactivate EPS Bearer Context Accept message to the MME to complete the PDN disconnection procedure.

As has become apparent from the above, the present disclosure provides a technique for preparing UE mobility from a 4G network to a 5G network for a UE moving from a 2G/3G network to the 5G network via the 4G network. According to the technique, one or more PDN connections associated with the UE may be terminated when the UE moves from the 2G/3G network to the 4G network forcing the UE to reestablish connectivity with the 4G network prior to moving from the 4G network to the 5G network. Triggering terminating the one or more PDN connections may be performed to ensure that, when reestablishing connectivity by the UE, at least one common network entity is selected which supports interworking between the 4G network and the 5G network so that seamless mobility of the UE from the 4G network to the 5G network may be performed (e.g., without session breaks). User experience for 4G to 5G mobility scenarios may thus be improved and corresponding signaling and network load may be reduced. In particular, call drops during IRAT handovers from an E-UTRAN/ Evolved Packet Core (EPC) to a Next Generation RAN (NG-RAN)/5G Core Network (5GC) may be avoided so that a voice call established on the E-UTRAN may be handed over seamlessly to the 5G system (5GS).

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for preparing User Equipment, UE, mobility from a 4G network to a 5G network for a UE moving from a 2G/3G network to the 5G network via the 4G network, the method being performed by a network node and comprising:
   triggering terminating one or more Packet Data Network, PDN, connections associated with the UE when the UE moves from the 2G/3G network to the 4G network forcing the UE to reestablish connectivity with the 4G network prior to moving from the 4G network to the 5G network;
   triggering terminating the one or more PDN connections is conditionally performed when at least one Access Point Name, APN, associated with the one or more PDN connections corresponds to a predetermined type of APN; and
   the predetermined type of APN is an APN type that is not usable with the 5G network.

2. The method of claim 1, wherein, when the UE reestablishes connectivity with the 4G network, connectivity is established using at least one common network entity that supports interworking between the 4G network and the 5G network.

3. The method of claim 2, wherein triggering terminating the one or more PDN connections is conditionally performed when the UE is determined to have 5G capabilities.

4. The method of claim 2, wherein triggering terminating the one or more PDN connections is conditionally performed when an indication from another network node is received requesting to release PDN connections when moving from a 2G/3G network to a 4G network.

5. The method of claim 2, wherein triggering terminating the one or more PDN connections comprises initiating a disconnection procedure for each of the one or more PDN connections.

6. The method of claim 2, wherein the one or more PDN connections comprise all PDN connections associated with the UE.

7. The method of claim 2, wherein triggering terminating the one or more PDN connections comprises initiating a detach procedure for the UE.

8. The method of claim 1, wherein triggering terminating the one or more PDN connections is conditionally performed when the UE is determined to have 5G capabilities.

9. The method of claim 8, wherein an indication that the UE has 5G capabilities is obtained from the UE.

10. The method of claim 9, wherein the indication that the UE has 5G capabilities is obtained during one of:
- an attach procedure performed by the UE with the 2G/3G network; and
- during a Tracking Area Update, TAU, procedure performed by the UE with the 4G network.

11. The method of claim 1, wherein triggering terminating the one or more PDN connections is conditionally performed when the UE is determined to have a 5G subscription.

12. The method of claim 1, wherein the predetermined type of APN is an APN type that supports provisioning of a real-time service to the UE.

13. The method of claim 1, wherein triggering terminating the one or more PDN connections is conditionally performed when an indication from another network node is received requesting to release PDN connections when moving from a 2G/3G network to a 4G network.

14. The method of claim 1, wherein triggering terminating the one or more PDN connections comprises initiating a disconnection procedure for each of the one or more PDN connections.

15. The method of claim 1, wherein the one or more PDN connections comprise all PDN connections associated with the UE.

16. The method of claim 1, wherein triggering terminating the one or more PDN connections comprises initiating a detach procedure for the UE.

17. The method of claim 1, wherein triggering terminating the one or more PDN connections comprises requesting the UE to reactivate the one or more PDN connections.

18. A network node for preparing User Equipment, UE, mobility from a 4G network to a 5G network for a UE moving from a 2G/3G network to the 5G network via the 4G network, the network node comprising at least one processor and at least one memory, the at least one memory containing instructions executable by the at least one processor such that the network node is configured to:
- trigger terminating one or more Packet Data Network, PDN, connections associated with the UE when the UE moves from the 2G/3G network to the 4G network forcing the UE to reestablish connectivity with the 4G network prior to moving from the 4G network to the 5G network;
- trigger terminating the one or more PDN connections is conditionally performed when at least one Access Point Name, APN, associated with the one or more PDN connections corresponds to a predetermined type of APN; and
- the predetermined type of APN is an APN type that is not usable with the 5G network.

* * * * *